May 20, 1924.

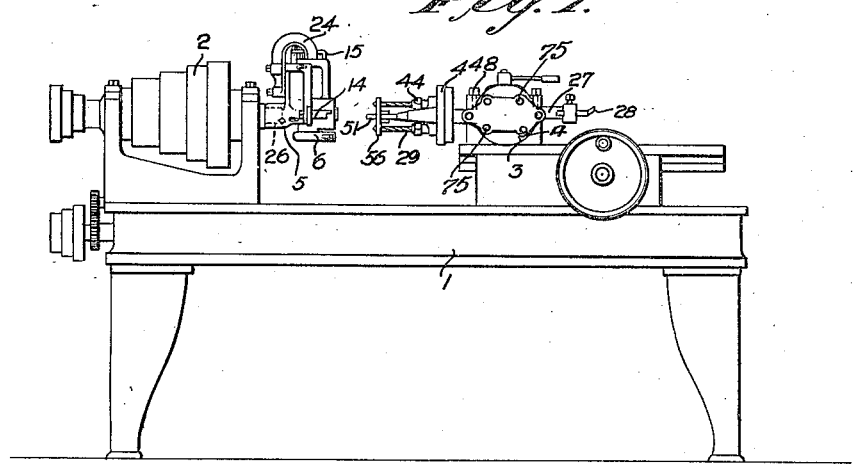
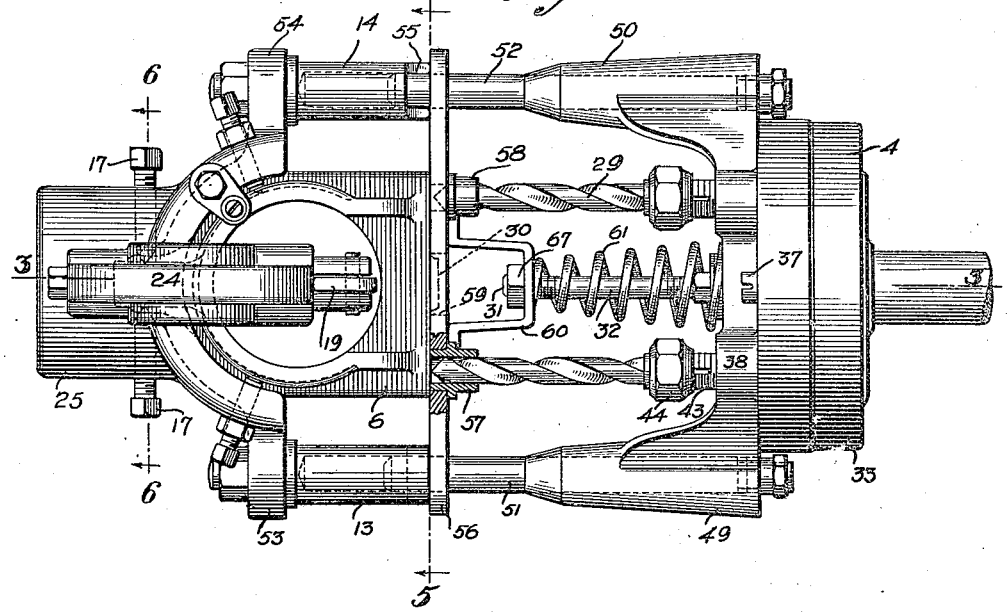

I. A. LAKE 1,495,085

DRILL APPARATUS

Filed Jan. 19, 1921 3 Sheets-Sheet 2

WITNESSES
H. C. Hoebig
A. L. Kitchin

INVENTOR
IRVING A. LAKE
BY Munn & Co
ATTORNEYS

Patented May 20, 1924.

1,495,085

UNITED STATES PATENT OFFICE.

IRVING A. LAKE, OF NEW YORK, N. Y., ASSIGNOR OF ONE-HALF TO EMILY LAKE, OF NEW YORK, N. Y.

DRILL APPARATUS.

Application filed January 19, 1921. Serial No. 438,443.

*To all whom it may concern:*

Be it known that I, IRVING A. LAKE, a citizen of the United States, and a resident of the city of New York, borough of the Bronx, in the county of Bronx and State of New York, have invented a new and Improved Drill Apparatus, of which the following is a full, clear, and exact description.
This invention relates to a drilling apparatus and has for an object to provide an improved construction wherein a number of drills may be nested in a comparatively small space and yet provided with driving connections for rotating the same during the drilling action.

Another object in view is to provide an attachment for turret lathes whereby the work may rotate and simultaneously drills, taps and other tools may operate thereon.

A further object of the invention is to provide an attachment for turret lathes wherein a work holder is connected to the rotating part of the lathe and the tool holder is connected to the turret of the lathe with interlocking connections between the work holder and the tool holder whereby power is transmitted to the tool holder for connecting any tools carried thereby.
A still further object of the invention is to provide an attachment for lathes comprising a work holding member and a tool holding member arranged to co-act so that the work held by the work holding member may be provided with a finished face, drilled and tapped.

In the accompanying drawings—

Figure 1 is a side view of a turret lathe with an embodiment of the invention shown applied thereto.

Figure 2 is a top plan view of the attachment shown in Figure 1, the same being on an enlarged scale and shown in operative position.

Figure 3:
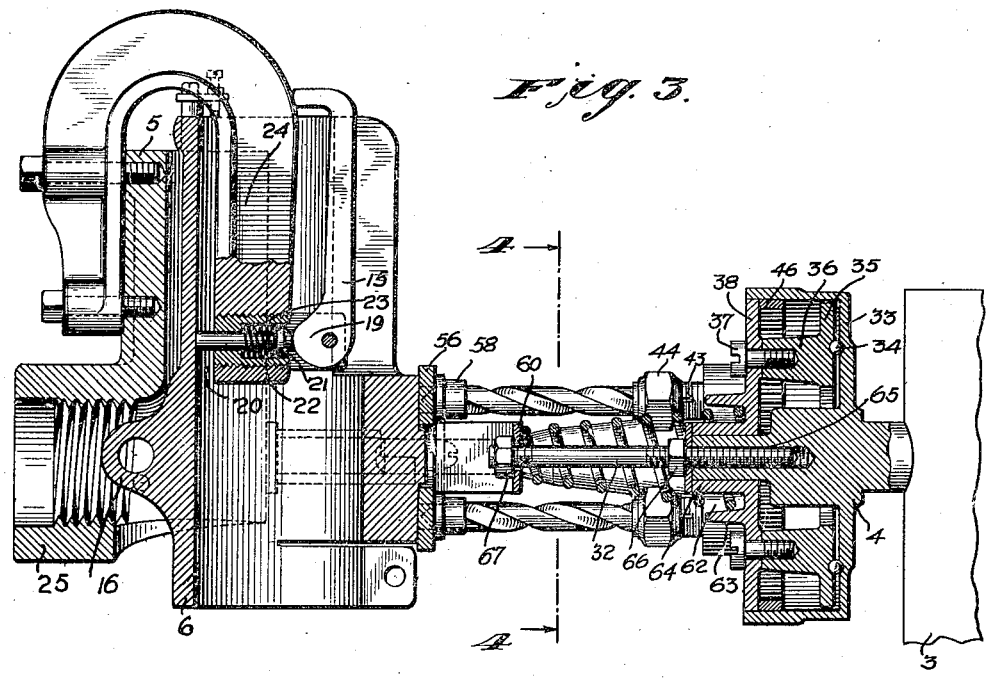
Figure 3 is a sectional view through Figure 2 approximately on line 3—3.
Figure 4:
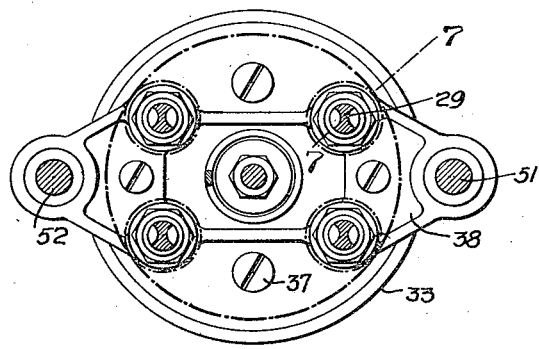
Figure 4 is a sectional view through Figure 3 on line 4—4.

In the manufacture of air cushions for automobiles, and a large number of other articles, it is necessary to finish or face off part of the casting or article drilling the same and sometimes tap the opening provided by the drills. Heretofore, these different operations have been performed independently, namely, the facing off has been done at one time and usually in one machine while the drilling is done in a second machine at a different time and the tapping is done in a third machine at still a different time. This requires the article to be properly set three times, which setting operation consumes an appreciable amount of time, and consequently, increases the cost of the finished article. In the present invention means have been provided which are used in connection with a turret lathe whereby the article of whatever nature may be set once and in a very easy manner and then faced, drilled and tapped without resetting and in quick succession.

In the accompanying drawings 1 indicates a turret lathe provided with the usual drive pulleys 2 and with a turret 3 of any desired construction. The turret 3 is intended to receive what may be termed a work head 4 forming certain features of the invention while the spindle of the cone pulley 2 is designed to receive the chuck or work holder 5. In the drawing a casting used as part of an air cushion has been shown for the purpose of illustration but it will be evident that other articles could be held in proper position without departing from the spirit of the invention.

Figure 5:
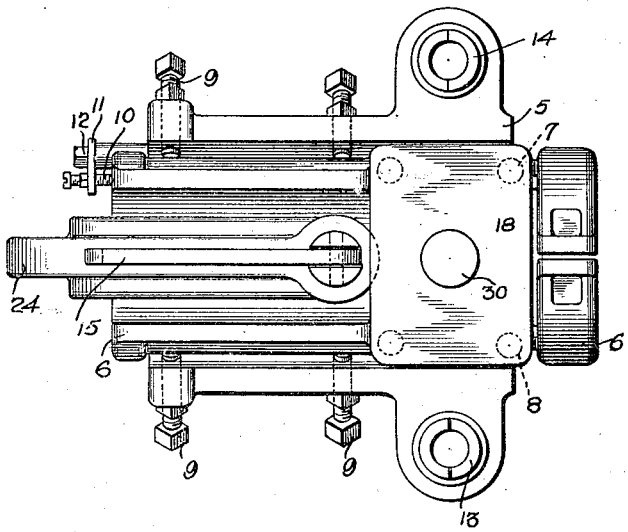
Figure 5 is a face view of a work holding chuck forming part of the attachment shown in Figure 2, said view being taken from line 5—5 of Figure 2.
Figure 6:
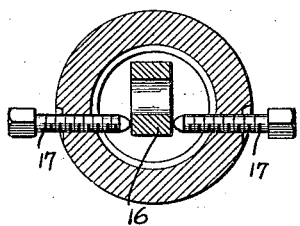
Figure 6 is a fragmentary sectional view through Figure 2 on line 6—6.

When operating on the casting 6 forming part of an air cushion, it is necessary to provide a finished face 7 which is then provided with holes 8, which holes are tapped for receiving the screws. In order to perform these three operations, the holder 5 is formed substantially arc-shaped to receive this particular article but when other articles are to be operated upon the holder it may, if desired, be made of some other shape. When a substantially tubular article is to be operated upon as shown in the drawings the holder is substantially semi-tubular and is provided with a number of set screws 9 on opposite sides for properly centering the article together with an adjustable screw 10 at one end which is held in place by a plate 11 clamped to the holder 5 by a screw 12 whereby it may be swung to one side whenever desired. The article 6 is placed with one end resting on the end of the holder 5 carrying the tubular extensions 13 and 14 and then slid toward the set screw 10 until it strikes the set screw whereupon the manually actuated lever 15 is moved until it assumes the position shown in Figure 3 whereupon the article 6 is locked in place. Before this locking operation takes place the depending lug 16 is forced between the auxiliary set screws 17 whereby the surface 18 faces in the proper direction though at this time it is unfinished. In order that the lever 15 may properly cause a clamping action it is provided with a cam 19 acting on a pin 20, which pin is provided with an enlargement 21 against which the spring 22 acts to move the same and cause the pin 20 to move out of engagement with the article 6. The spring 22 is arranged in a socket 23 in a U-shaped bar 24, which bar is fastened by screws or otherwise rigidly to the holder 5. The holder 5 is provided with an internally threaded tubular extension 25 which screws onto the spindle 26 of the lathe 1 instead of the usual chuck whereby whenever the lathe is operated the holder 5 will be rotated together with any work clamped therein. It will be noted that the casting 6 is so held in the work holder 5 that substantially the central point of the face 18 is in line with the center of the tubular member 25 and thereby the pressure against said face will be resisted by the spindle of the lathe though this is not essential as the face to be worked upon may be offset. After the casting and the work holder have both been arranged as shown for instance in Figures 1, 3 and 5 a tool carrying member 27 is provided with the proper tool 28 mounted on the turret 3 and two work heads 4 are mounted on this turret, one carrying a number of drills 29 and the other carrying the same number of taps.

Figure 7:
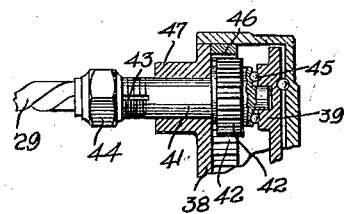
Figure 7 is a detail fragmentary sectional view through Figure 4 on line 7—7.

To begin the operation the tool 28 is turned to the correct position facing the casting 6 and then the turret is moved over while the casting is rotated by the lathe. This will cause the tool 28 to face off the face 18. By the use of the particular tool mentioned a central lug 30 is left at the center but if desired this could be cut off at the same time. As soon as the face 18 has been properly faced off the turret is moved back usually without stopping the lathe and the turret again turned until the tools 29 are in the position shown in Figure 1. The turret is then moved up as shown in Figure 2 and said movement is continued until the end 31 of rod 32 strikes the lug 30. As the head 4 carrying the drills 29 is moved up toward the work, said drills will each drill a hole. As shown in the drawing only four drills are present, but if desired, a greater or less number could be used without departing from the spirit of the invention. Also, by adjusting the rod 32 longitudinally the holes drilled could be of greater or less depth. In order to produce a proper action of the drills as they are forced toward the work, the work head 4 is constructed as shown in Figures 2, 3 and 7.

As shown particularly in Figure 3 the work head 4 is provided with a casing 33 provided with suitable thrust ball bearings 34 for supporting what may be termed a spider 35, which spider has a plurality of raised portions 36 for receiving the screws 37, which screws clamp in place the face plate 38. The spider 36 is also provided with a number of raised portions 39 (Fig. 7) having suitable sockets 40 for receiving the ends of the shafts 41, which shafts carry the pinions 42. The outer end of each of the shafts 41 is hollow, slotted at 43 and externally threaded for receiving the nut 44. This nut preferably has a tapering threaded bore so that when screwed onto the threaded section 43 it will collapse said threaded section and thereby cause the same to grip the respective drills 29. On each of the raised portions 39 is formed a ball race into which a number of anti-friction balls 45 are placed, said balls fitting into suitable grooves formed in the side of the respective gear wheels 42. If desired, other forms of anti-friction retaining means may be used provided some form of thrust bearing is presented which will permit a free rotation of the respective pinions 42. There is one pinion for each drill 29 and all of the pinions are continually in mesh with an internal gear 46, which gear is rigidly secured in the casing 43 in any desired manner.

It will be noted that the raised portions 39 form centering devices for the shafts 41 which shafts are also properly centered or held by bosses or enlargements 47 forming part of the face plate 39. By this construction and arrangement the casing 33 is held stationary in the turret 3 by any suitable means, as for instance, the set screw 48 and if the face plate 38 is rotated the action of the pinions 42 on the stationary rack 41 will cause an independent rotation of each of the drills 39. In order that the face plate 38 may rotate with the work holder 5, said face plate is provided with enlargements 49 and 50 which receive rods 51 and 52, said rods being held in place in any desired manner and preferably somewhat rounded at the outer ends so that when they strike the tubular members 13 and 14 rigidly secured to the ears 53 and 54 they may easily slide into the bores of these tubular members. In order to assist this action each of the tubular members is provided with a cut-away portion 55 which exposes part of the bore and thereby permits the workmen to move the turret over until the rods 51 and 52 overlap the tubular members 13 and 14 to a small extent. As soon as the tubular members strike the rods 51 and 52 the engagement is complete and if desired, the lathe may be speeded up and the turret moved over quickly toward the work so that the drilling operation may be done rapidly. In this way the plate 38 is rotated by the work holder and, consequently, power is transmitted as above described through the various drills for rotating them independently. A transverse guide bar 56 is loosely mounted on the rods 51 and 52, said guide bars carrying drill bushings 57 and 58 through which the drills 29 pass and which normally hold the cutting end of the drills shown in Figure 2 so as to guide the same as they first engage the work. The guiding bar is also provided with an opening 59 for accommodating the lug 30 and permit the end 31 of rod 32 to engage said lug. A guiding bracket 60 is secured in any desired manner to the plate 56 and has an aperture through which the rod 32 extends whereby said rod may freely slide in said bracket. A spring 61 is arranged so that one end will press against the bracket 60 and the opposite end against the plate 38, said opposite end being fitted into a socket 62 formed by tubular flanges 63 and 64. Rod 32 is screwed into an extension 65 of casing 33 (Fig. 3) and is locked in place by a suitable lock nut 66. A nut 67 is threaded onto the end projecting through the bracket 60 whereby the guide plate 56 is always held in proper position and is designed to engage the casting 6 so as to prevent any side tension on the drills 29.

In case it is desired to drill holes of less depth than indicated in the drawing lock nut 66 will be loosened and rod 32 unscrewed to the desired extent and then lock nut 66 tightened. This lengthens the distance between the end 31 and the plate 38 so that end 31 will engage the lug 30 sooner. If it is desired to bore holes to a greater depth a reverse adjustment would be made.

After the holes have been bored the turret 3 is moved back to the disengaged position, as for instance the position shown in Figure 1, and the turret is then again turned a quarter turn so as to present to the face of the work another work-head which is in all respects similar to the work-head 4, above described. This new work-head instead of being provided with drills 29, is provided with taps 75. After the new work-head has been turned so as to present its taps ready to be applied to the holes into the work, the turret 3 is forced manually or otherwise toward the work until the said taps have engaged the holes in the work and performed therein their threading operation. After the taps have performed their function it will be necessary to reverse the rotation of the work in order to remove the taps. After the removal of the taps the lever 15 is moved to a disengaged position and the casting 6 is then removed and a new one substituted. The same operation is performed and then the new casting removed after which a third casting is supplied and the operation repeated. This is done as often as desired. In some instances it is only necessary to face off the work and provide apertures. Where this is the case the use of the work head having taps is dispensed with.

It will be noted that by holding the work in a given position during the three operations performed thereon a minimum time is used in finishing the work desired. It will also be observed that by the particular construction and arrangement of work head a few or a large number of drills or taps may be operated in a small space at the same time.

I would state in conclusion that while the illustrated examples constitute a practical embodiment of my invention, I do not limit myself strictly to the exact details illustrated and described since manifestly the same can be considerably varied without departure from the spirit of the invention as defined in the appended claims.

What I claim is:—

1. In an attachment for lathes an article holding member formed with a plurality of tubular members, means for clamping an article in the article holding member, a pair of bars co-acting with said tubular members and adapted to slidingly operate therein, a drill mechanism actuated by said bars and means for guiding the drills operated by said mechanism so that they will bore holes in the article held by said article holding member.

2. In an attachment of the character described a work head provided with a plurality of drills, means for moving said drills in a circle and at the same time individually rotating the drills, said means including a pair of driving bars and a work holding member adapted to be connected with the rotating part of a lathe, said work holding member being formed with means having a sliding interlocking action with said bars whereby as the drills are moved toward the work holder power will be transmitted thereto.

3. In an attachment for lathes a work head provided with a plurality of independent drills, means for moving said drills in a circle and at the same time independently revolving each drill, said means including a pair of arms and means for holding a piece of work in front of said drills, said means including projections adapted to engage said arms for rotating the arms and means associated therewith.

4. A drilling attachment comprising a stationary casing, an internal gear carried by the stationary casing, a plurality of pinions meshing with said internal gear, an implement connected with each of said pinions and rotated thereby, means for moving said pinions in a circle while in engagement with said gear whereby the implements connected with the pinions will be individually rotated as well as moving in a circle and means for connecting power to the means which moves the pinions in a circle.

5. A drilling apparatus comprising a stationary casing provided with an interior gear, a face plate arranged adjacent said casing, a plurality of pinions carried by said face plate and meshing with said interior gear, means for connecting an implement to each of said pinions so as to be rotated individually thereby and power receiving means connected with said face plate for rotating the same and causing the pinions to move in a circle and thereby be individually rotated by said rack.

6. A drill apparatus comprising a casing, a face plate, a plurality of pinions supported by said face plate, an internal gear carried by said casing and arranged to continually engage said pinions, means for connecting an implement to each of said pinions and means adapted to engage a rotating work for causing said face plate to rotate.

7. A drilling apparatus comprising a rotatable casing, an internal gear carried by said casing, a plurality of pinions meshing with said internal gear, means for connecting an independent tool to each of said pinions and means for holding said pinions in position for moving the same about a central axis for engagement with said internal gear.

8. A drilling apparatus comprising a casing, an internal gear carried by the casing and a plurality of pinions meshing with said internal gear, means for clamping a tool to each of said pinions so as to be independently rotated thereby and a rotating supporting member for rotating said pinions about a central axis so that said pinion and tools may be rotated individually.

9. A drilling apparatus comprising a casing, an internal gear carried by said casing, a plurality of pinions meshing with said internal gear, means for holding said pinions in engagement with said rack, means for clamping a tool to each of said pinions, a guide for said tool and adjustable means for limiting the longitudinal movement of said tools.

10. A drilling apparatus comprising an internal gear, a plurality of pinions meshing with said internal gear, a shaft for each of said pinions, means for supporting said shafts in their relative position, means for rotatively holding said supporting means adjacent said internal gear whereby said pinions may mesh with said internal gear and thereby rotating each relative to the supporting means, and a further means for connecting a tool to each of said shafts.

11. A drilling apparatus comprising a rack, a plurality of pinions connected with said rack, means for supporting said rack, a shaft for each of said pinions, a plate for supporting said shaft, means for connecting a tool with each of said shafts, a spring pressed guide for said tools and adjustable means for limiting the longitudinal movement of said tools.

IRVING A. LAKE.